United States Patent
Kikuta et al.

(10) Patent No.: US 11,778,125 B2
(45) Date of Patent: Oct. 3, 2023

(54) IMAGE PROCESSING APPARATUS, METHOD, AND PRODUCT GENERATING CORRECTION INFORMATION IN ASCENDING ORDER FROM A REGION OF A SMALLER NUMBER OF PRINTING MATERIALS

(71) Applicant: CANON KABUSHIKI KAISHA, Tokyo (JP)

(72) Inventors: Kyohei Kikuta, Tokyo (JP); Naoya Takesue, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/944,696

(22) Filed: Sep. 14, 2022

(65) Prior Publication Data

US 2023/0082464 A1    Mar. 16, 2023

(30) Foreign Application Priority Data

Sep. 15, 2021   (JP) .................. 2021-150415

(51) Int. Cl.
   *H04N 1/60*          (2006.01)

(52) U.S. Cl.
   CPC ........... *H04N 1/605* (2013.01); *H04N 1/6008* (2013.01); *H04N 1/6027* (2013.01); *H04N 1/6036* (2013.01)

(58) Field of Classification Search
   None
   See application file for complete search history.

(56) References Cited

U.S. PATENT DOCUMENTS

| | | | |
|---|---|---|---|
| 8,941,876 B2 * | 1/2015 | Tamagawa | B41J 2/17566 358/1.2 |
| 9,201,371 B2 * | 12/2015 | Tamura | H04N 1/6033 |
| 9,349,083 B2 | 5/2016 | Kikuta | H04N 1/405 |
| 9,383,706 B2 * | 7/2016 | Tamura | G03G 15/55 |
| 10,848,643 B2 | 11/2020 | Takesue et al. | H04N 1/54 |
| 2023/0055221 A1 * | 2/2023 | Takesue | G01J 3/40 |

FOREIGN PATENT DOCUMENTS

JP        2015-160352        9/2015

OTHER PUBLICATIONS

U.S. Appl. No. 17/882,484, filed Aug. 5, 2022.

* cited by examiner

*Primary Examiner* — Scott A Rogers
(74) *Attorney, Agent, or Firm* — Venable LLP

(57) ABSTRACT

An image processing apparatus comprises a generation unit configured to generate correction information for reducing density change in image formation using a printing material including a plurality of colors. The generation unit generates correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

11 Claims, 10 Drawing Sheets

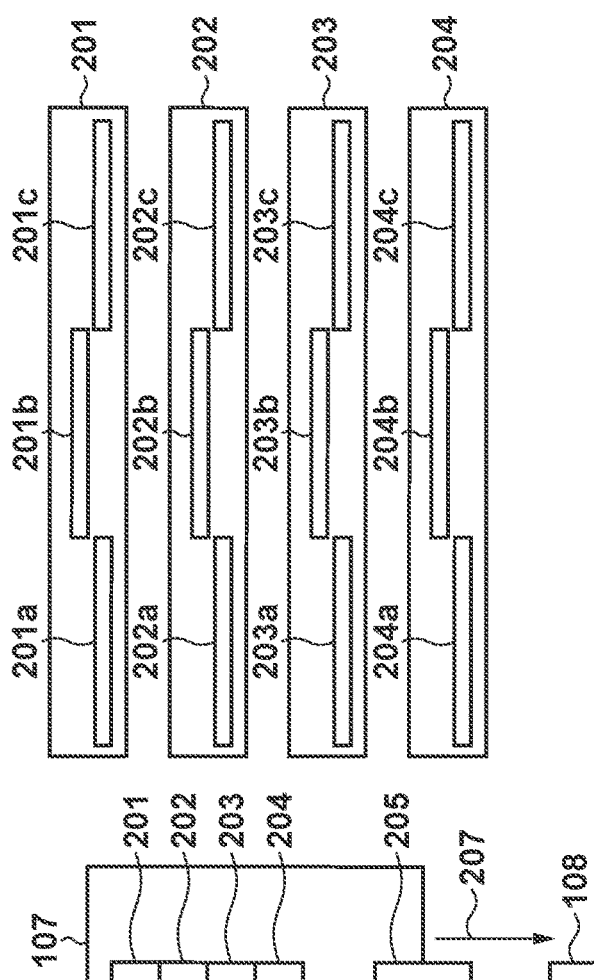
FIG. 2A
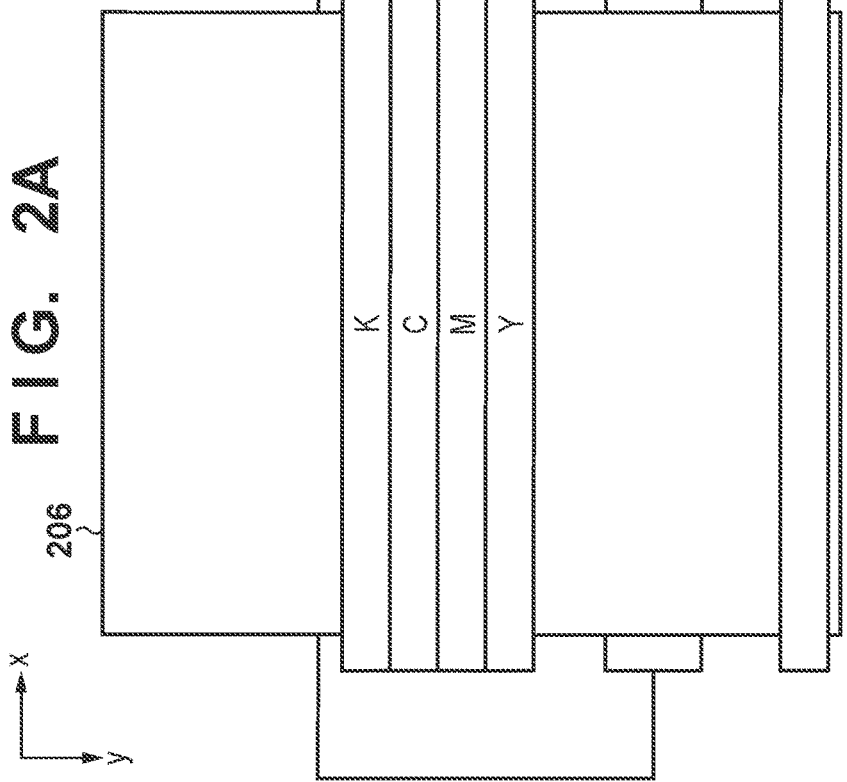
FIG. 2B
FIG. 2C
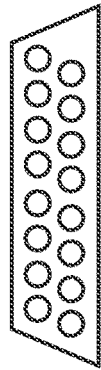
FIG. 2D

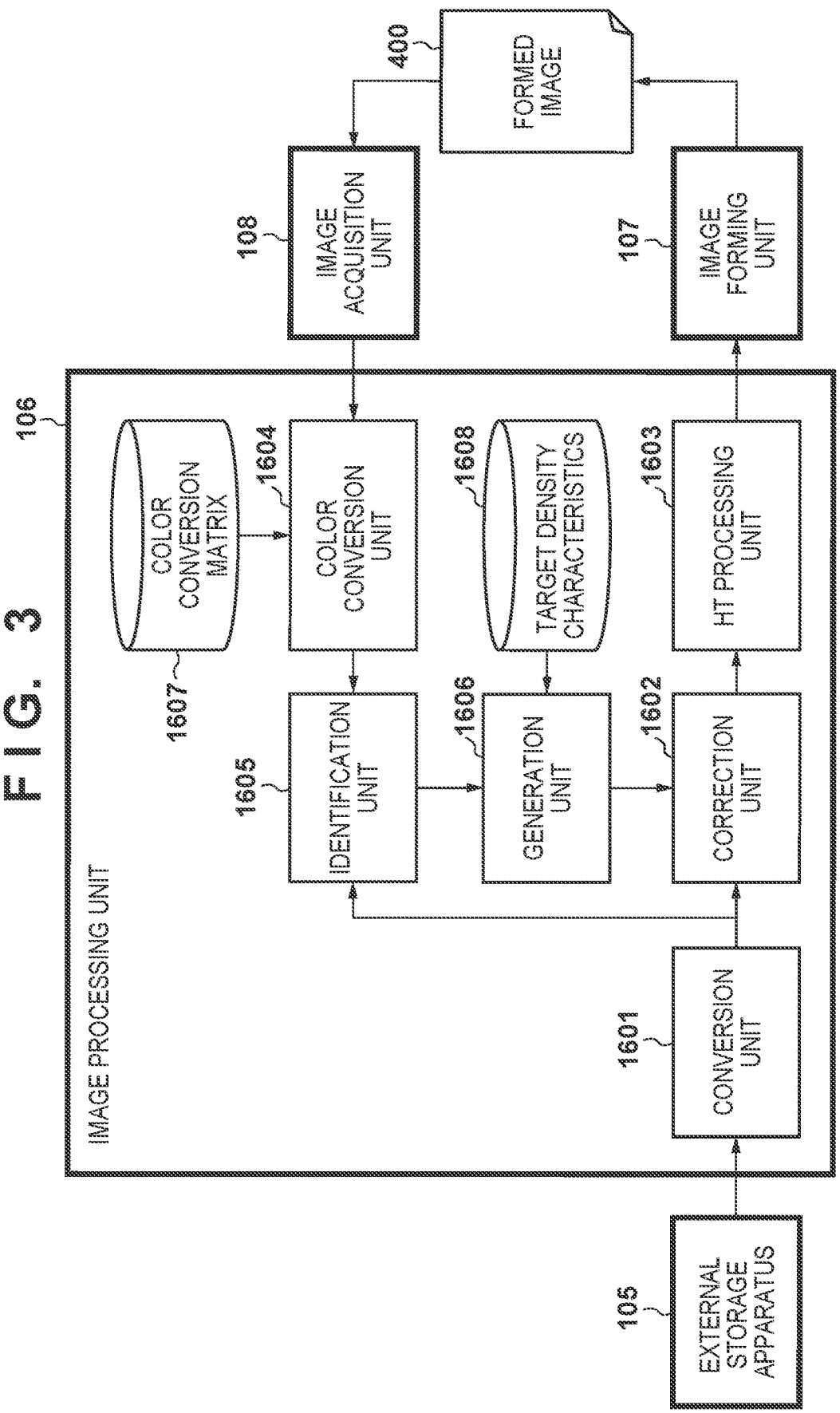

FIG. 5

| | PRINT HEAD 201(K) | | | PRINT HEAD 202(C) | | | PRINT HEAD 203(M) | | | PRINT HEAD 204(Y) | | |
|---|---|---|---|---|---|---|---|---|---|---|---|---|
| | 201a | 201b | 201c | 202a | 202b | 202c | 203a | 203b | 203c | 204a | 204b | 204c |
| 0 | 0 | 0 | 0 | 0 | 0 | 0 | 0 | 0 | 0 | 0 | 0 | 0 |
| 16 | 14 | 16 | 20 | 15 | 16 | 12 | 10 | 16 | 13 | 22 | 16 | 15 |
| 32 | 28 | 32 | 39 | 31 | 32 | 25 | 20 | 32 | 26 | 46 | 32 | 30 |
| ... | ... | ... | ... | ... | ... | ... | ... | ... | ... | ... | ... | ... |
| 240 | 221 | 240 | 255 | 238 | 240 | 185 | 148 | 240 | 197 | 255 | 240 | 232 |
| 255 | 236 | 255 | 255 | 250 | 255 | 202 | 159 | 255 | 211 | 255 | 255 | 252 |

INPUT COLOR SIGNAL VALUE (leftmost column)

IMAGE PROCESSING APPARATUS, METHOD, AND PRODUCT GENERATING CORRECTION INFORMATION IN ASCENDING ORDER FROM A REGION OF A SMALLER NUMBER OF PRINTING MATERIALS

BACKGROUND OF THE INVENTION

Field of the Invention

The present invention relates to an image processing technique.

Description of the Related Art

Printers using an inkjet system that form an image by discharging ink from a plurality of nozzles are widely used as image forming apparatuses configured to form any desired image on a surface of paper. Alternatively, printers employing an electrophotographic method are also widely used that form an image using laser photoconductors and charged toner.

With regard to an electrophotographic method, however, it is known that the color tone of a formed image may change depending on the amount of toner remaining in the apparatus, or environmental conditions such as ambient temperature and humidity. It is also known for an inkjet system that the color tone may change depending on ink adhesion to the periphery of the nozzle, aging of piezo elements or heaters that control ink discharge, or ambient environment such as temperature and humidity. There is known a technique that keeps suppressing the change of color tone by executing a stabilization process at a regular interval on such a change due to ambient environment or aging.

The aforementioned stabilization process often outputs a dedicated chart in order to measure the characteristics of the printing material such as toner or ink of each color. However, outputting a dedicated chart uses printing materials, sheets, and time originally intended to be used by the user to output a desired image, which may lead to cost increase. In addition, extending the interval between outputting of charts to avoid cost increase may reduce the accuracy of stabilization. Japanese Patent Laid-Open No. 2015-160352 discloses a technique for maintaining the accuracy of stabilization while avoiding cost increase by performing a stabilization process based on the output user image.

The aforementioned Japanese Patent Laid-Open No. 2015-160352 stabilizes colors in output images, in the color stabilization process, by estimating an apparent printing amount of each toner by a search from results of color measurement of a multicolor toner image, and changing the image formation condition of each toner.

In the foregoing approach, Japanese Patent Laid-Open No. 2015-160352 performs the same processing regardless of the color type of the toner. However, with regard to a mixed color reproduced by overlapping a plurality of printing materials, the relation between the amount of each printing material and the degree of color development of the mixed color is generally non-linear. And thus, in some cases, an estimation accuracy may be reduced and color stabilization may not be sufficiently performed when estimating the amount of each printing material from the mixed color.

SUMMARY OF THE INVENTION

The present invention provides a technique for performing color stabilization with an improved accuracy.

According to the first aspect of the present invention, there is provided an image processing apparatus comprising a generation unit configured to generate correction information for reducing density change in image formation using a printing material including a plurality of colors, wherein the generation unit generates correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

According to the second aspect of the present invention, there is provided an image processing method to be performed by an image processing apparatus, the method comprising generating correction information for reducing density change in image formation using a printing material including a plurality of colors, wherein, in the generating, generating correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

According to the third aspect of the present invention, there is provided a non-transitory computer-readable storage medium storing a computer program for causing a computer to function as a generation unit configured to generate correction information for reducing density change in image formation using a printing material including a plurality of colors, the generation unit generates correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

Further features of the present invention will become apparent from the following description of exemplary embodiments with reference to the attached drawings.

BRIEF DESCRIPTION OF THE DRAWINGS

FIGS. 2A to 2D are explanatory diagrams of a printer applied to an image forming unit 107;

FIG. 3 is a block diagram illustrating a functional configuration example of an image processing unit 106;

FIG. 5 is a diagram illustrating an example of the correction table;

DESCRIPTION OF THE EMBODIMENTS

Figure 1:
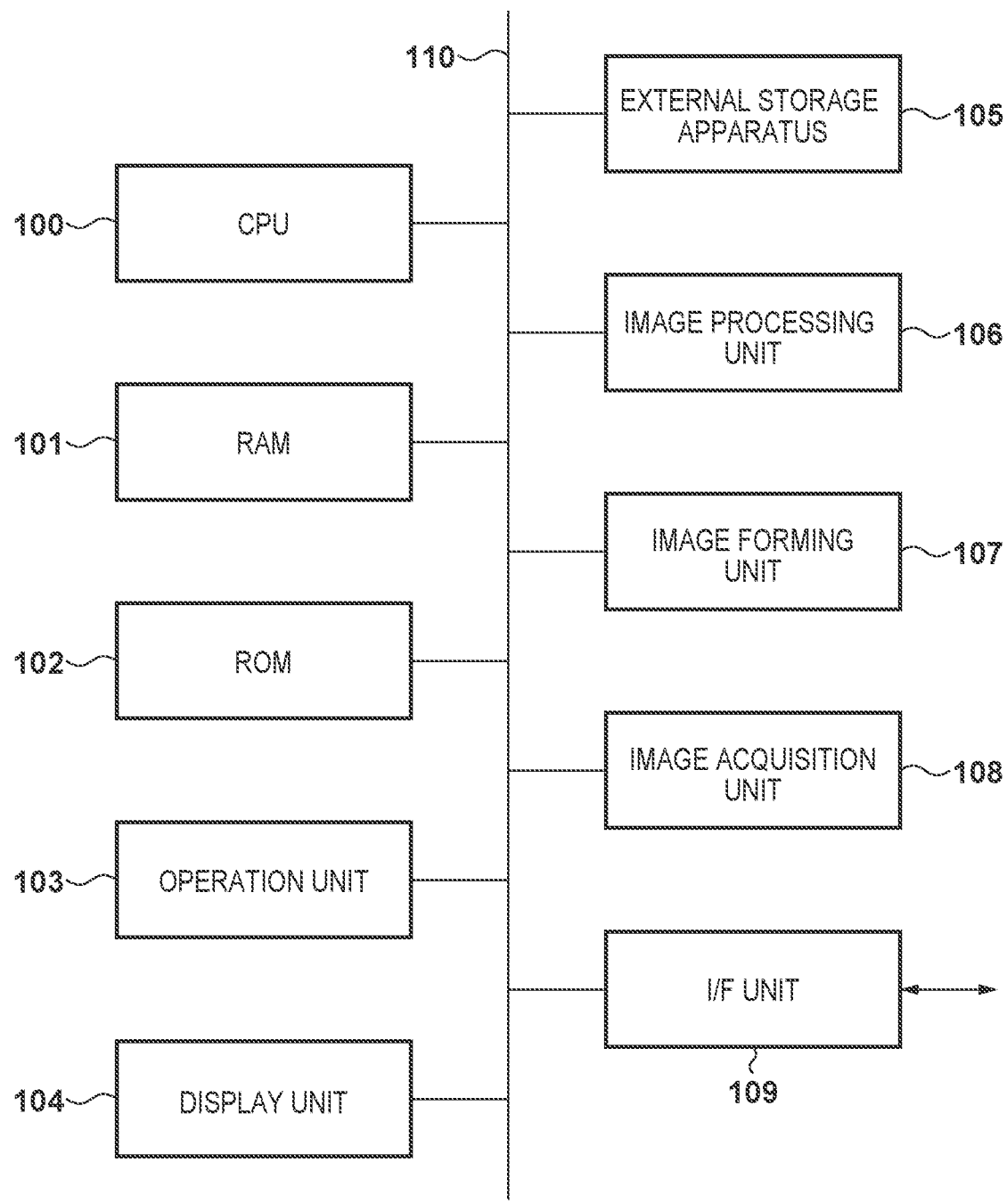
FIG. 1 is a block diagram illustrating a hardware configuration example of an image forming system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Hardware Configuration Example of Image Forming System>

First, a hardware configuration example of an image forming system (image forming apparatus) according to the present embodiment will be described, referring to a block diagram of FIG. 1. FIG. 1 illustrates major components related to respective processes described below, but not illustrating all the components included in the image forming system.

A Central Processing Unit (CPU) 100 executes various types of processing using computer programs and data stored in a Random Access Memory (RAM) 101 or a Read Only Memory (ROM) 102. The CPU 100 thus controls the operation of the entire image forming system, as well as executing or controlling respective processes described to be performed by the image forming system. Although the present embodiment is described assuming that the CPU 100 controls the entire image forming system, a plurality of hardware may control the entire image forming system in a process-sharing manner.

The RAM 101 includes an area for storing computer programs and data loaded from the ROM 102 or an external storage apparatus 105, and an area for storing images read by an image acquisition unit 108. The RAM 101 further includes an area for storing data received from the outside via an I/F unit 109, and a work area used when the CPU 100 and an image processing unit 106 execute various types of processing. The RAM 101 may thus provide various areas as appropriate.

The ROM 102 has stored therein setting data of the image forming system, computer programs and data related to activation of the image forming system, computer programs and data related to basic operations of the image forming system, or the like.

An operation unit 103, which is a user interface such as a keyboard, a mouse, a touch panel, a numeric keypad, or various types of buttons, can be operated by the user to input various instructions or information to the CPU 100.

A display unit 104, which is a display apparatus including a screen such as a liquid crystal screen or a touch panel screen, can display images or characters indicating results of processing performed by the CPU 100 or the image processing unit 106.

The external storage apparatus 105 is a large-capacity information storage apparatus such as a hard disk drive. The external storage apparatus 105 has stored therein an operating system (OS), computer programs and data for causing the CPU 100 or the image processing unit 106 to execute various types of processing. The data stored in the external storage apparatus 105 include various matrices to be used in the processes described below, for example. The computer programs and data stored in the external storage apparatus 105 are loaded to the RAM 101 according to the control by the CPU 100, and subjected to processing by the CPU 100 or the image processing unit 106.

The image processing unit 106, which is implemented by a processor that can execute computer programs or a dedicated image processing circuit, executes various image processing for converting an image input to be printed into an image that can be output by the image forming unit 107. Additionally, in the present embodiment, the image processing unit 106 also executes a color stabilization process based on the result of reading a user image (image that the user desires to print). Here, instead of preparing a dedicated processor as the image processing unit 106, the CPU 100 may be configured to operate as the image processing unit 106 to perform various types of processing.

The image forming unit 107 forms an image on a printing medium such as paper using a printing material, based on the image acquired from the image processing unit 106, the RAM 101, the external storage apparatus 105, the I/F unit 109, or the like. It is assumed in the present embodiment that the image forming unit 107 uses at least four types of printing materials such as cyan (C), magenta (M), yellow (Y) and black (K), for example.

The image acquisition unit 108 is an image sensor (line sensor or area sensor) configured to capture an image formed on a printing medium by the image forming unit 107. It is assumed in the present embodiment that the image acquisition unit 108 (image sensor) is an image sensor that can acquire three output values (output values of R (red), G (green) and B (blue)) respectively having peaks at different wavelengths. The output value is color information such as a luminance value.

The I/F unit 109 functions as an interface configured to connect the image forming system with an external device. For example, the I/F unit 109 functions as an interface configured to exchange data with a communication apparatus by using infrared communication or a wireless Local Area Network (LAN), or an interface configured to connect to the Internet.

Any of the aforementioned units can be connected to the bus 110 and exchange data via the bus 110. However, the image forming system may be configured so that the aforementioned units (e.g., the image forming units 107) are connected via the I/F unit 109.

<Image Forming Unit 107 and Image Acquisition Unit 108>

First, description will be provided regarding the image forming unit 107. It is assumed in the present embodiment that the image forming unit 107 is a printer using an inkjet system configured to discharge ink of cyan (C), magenta (M), yellow (Y) and black (K) on a printing medium to form an image on the printing medium.

As illustrated in FIG. 2A, the image forming unit 107 indicates print heads 201 to 204 on a frame forming a structural material of the printer. Each of the print heads 201 to 204 is of a so-called full-line type including a plurality of nozzles configured to discharge ink of K, C, M and Y arranged along a predetermined direction in a range corresponding to the width of the printing sheet 206 provided as a printing medium.

Additionally, as illustrated in FIG. 2B, the print heads 201 to 204 are configured by combining a plurality of head modules (printing units). For example, head modules 201a, 201b and 201c included in the print head 201 are arranged alternately with respect to the conveyance direction of the printing medium. The same goes for head modules 202*a*, 202*b* and 202*c* included in the print head 202, head modules 203*a*, 203*b* and 203*c* included in the print head 203, and head modules 204*a*, 204*b* and 204*c* included in the print head 204, respectively.

Furthermore, as illustrated in FIG. 2C, a head module 201*a* includes chip modules (printing units) 201*a*-1 to 201*a*-5. It is assumed here that the chip modules are respectively connected to independent substrates. The same goes for other head modules.

FIG. 2D, which is a view of one of the chip modules seen from the surface of the printing medium side, indicating that the chip module includes a plurality of nozzles (printing units). In the example illustrated in FIG. 2D, the chip module includes 16 nozzles. The resolution of the nozzle arrangement of the nozzle column of each ink color is 1200 dpi, for example.

The printing sheet 206 provided as the printing medium is conveyed, in a direction (conveyance direction) indicated by an arrow 207 in the diagram, by rotation of a conveyance roller 205 (and other rollers not illustrated) caused by a driving force of a motor (not illustrated). Subsequently, single-raster images corresponding to each of the nozzle columns of the print heads 201 to 204 are formed in sequence by discharging ink from the plurality of nozzles of each of the print heads 201 to 204 according to the print data (image converted by the image processing unit 106) while the printing sheet 206 is being conveyed. Repeating such an ink discharge operation from the print heads 201 to 204 on the printing sheet 206 being conveyed allows for printing a single-page image on the printing sheet 206.

As illustrated in FIG. 2A, the image acquisition unit 108 is a line sensor installed downstream of the print heads 201 to 204 in the conveyance direction indicated by the arrow 207 and covering the entire surface of the printing sheet 206 in order to read the entire surface of the printing sheet 206.

The image acquisition unit 108 sequentially performs image capturing of the printing sheet 206 being conveyed, in parallel with image formation on the printing sheet 206 by the print heads 201 to 204, to generate an image (two-dimensional image) in which pixels each having pixel values for three, i.e., RGB channels. The CPU 100 then stores the generated image in the external storage apparatus 105 as a two-dimensional read-out image.

Here, the image forming unit 107 is not limited to the full-line type apparatus illustrated in FIGS. 2A to 2D. For example, the image forming unit 107 may be a so-called serial type printing apparatus configured to scan and print with the print heads in a direction crossing the conveyance direction of the printing sheet. In addition, an image formation method used by the image forming unit 107 may employ an electrophotographic method that form an image using a laser photoconductor and charged toner, or a thermal transfer method that vaporize solid ink by heat and transfer the vaporized ink to a printing paper.

The image acquisition unit 108 is not limited to the line sensor illustrated in FIGS. 2A to 2D. For example, the image acquisition unit 108 may be an apparatus including a carriage configured to move in a direction crossing the conveyance direction of the printing sheet, and configured to acquire any desired region with a smaller width than that of the printing sheet 206.

<Overview of Color Stabilization Process>

Next, there will be described a color stabilization process performed by the image processing unit 106. It is known that, even when same images are being formed, the density of the images formed by each of print heads on the printing medium may change depending on ink adhesion to the periphery of the nozzle, aging of piezo elements or heaters that control ink discharge, or ambient environment such as temperature and humidity. Such density change in an image, which is visually recognized as a density unevenness or color shift, may degrade the image quality (quality of printed material with image printed thereon) and is therefore desired to be suppressed as much as possible.

As illustrated in FIGS. 2A to 2D, the image forming system according to the present embodiment allows the image acquisition unit 108 (line sensor) installed downstream of the print heads 201 to 204 in the conveyance direction to read the image formed by the print heads 201 to 204. In other words, density change can be suppressed by estimating the aforementioned density change by the read-out image from the image acquisition unit 108 and performing the color stabilization process.

In other words, the image forming system according to the present embodiment forms any desired image by mixing four ink colors C, M, Y and K, as illustrated in FIGS. 2A to 2D. Accordingly, density change over time occurs independently for each of the ink colors C, M, Y and K. Therefore, it is possible to effectively reduce density change by performing independent gamma correction processes corresponding to respective colors on the printing amount of ink corresponding to respective colors.

Here, density change in each printing material likely to vary on head-module-by-head-module basis or chip-module-by-chip-module basis, in which the head modules and the chip modules are described above. Furthermore, it is often the case that the change amount differs for each nozzle even in the same module. It is therefore desirable to estimate density change and perform the gamma correction process on a nozzle-by-nozzle basis. However, as described below, the process may be performed on chip-module-by-chip-module basis or head-module-by-head-module basis instead of nozzle-by-nozzle basis, depending on the processing load.

For example, independently correcting each of the print heads 201 to 204 in the example illustrated in FIGS. 2A to 2D requires a process of estimating density change four times (for C, M, Y and K). Alternatively, regarding each of head-modules, the estimation process must be performed 12 times that is four colors×three head modules in order to perform correction for each of the three head modules independently, as illustrated in FIG. 2B. Similarly, on chip-module-by-chip-module basis, there are five chip modules as illustrated in FIG. 2C and therefore the estimation process must be performed 60 times, whereas on nozzle-by-nozzle basis, estimation process must be performed 960 times since there are 16 nozzles per chip module.

As such, a smaller unit of correction results in a larger number of times the estimation process must be performed. Therefore, a high-speed estimation process is required in order to perform correction in small units while maintaining an identical printing speed.

The present embodiment therefore preliminarily generates and stores a matrix associating the sensor output values (RGB values (sensor output values each corresponding to R, G and B components)) output from the image acquisition unit 108, and the reflectance on the printing medium. High-speed estimation is then enabled in a manner such that, each time a user image is printed, the sensor output values (RGB values), which are output from the image acquisition unit 108 by reading the user image, are converted by the matrix, and a correction table is generated based on the values acquired by the conversion.

In addition, it is possible to efficiently acquire the desired density information required for the color stabilization process, provided that density change is detected using a dedicated chart in the color stabilization process. From the user's viewpoint, however, a dedicated chart, which is not the user image originally desired to print, takes up costs such as sheets, printing materials, or time. Therefore, it is desirable to use the user image instead of the dedicated chart.

When using the user image for the color stabilization process, the user image is not necessarily advantageous image for acquiring desired density information required for the color stabilization process. Notably, estimating density change in each printing material from sensor output values of a multicolor region having a plurality of colors mixed therein tends to reduce the estimation accuracy due to the non-linearity of the relation between the amount of each printing material and the degree of color development of the mixed color. Accordingly, there is a possibility that sufficient color stabilization cannot be performed.

The present embodiment therefore acquires density information to perform the aforementioned estimation by referring to an input user image and preferentially using a region in which only a single printing material is used (single-color region), and uses the result to correct density change in the other printing materials, In the foregoing manner, it becomes possible to increase the estimation accuracy of density change in each printing material without using a dedicated chart.

In the following, there will be described a configuration of the image processing unit 106 that executes the aforementioned process and the color stabilization process, referring to FIGS. 3 and 4. FIG. 3 is a block diagram illustrating a functional configuration example of an image processing unit 106.

A conversion unit 1601 converts the input image read from the external storage apparatus 105 into an image corresponding to the color reproduction region of the image forming unit 107. The input image is described in accordance with color coordinates (R, G and B) among color space coordinates such as sRGB, which is the color representation by the monitor. The conversion unit 1601 performs a process of converting the input image into color signals corresponding to a plurality of ink colors used in the image forming unit 107. For example, when the image forming unit 107 uses ink of black (K), cyan (C), magenta (M) and yellow (Y), the input image is converted by the conversion unit 1601 into an image (CMYK image) formed of 8-bit color signals for K, C, M and Y, respectively. The CMYK image output by the conversion unit 1601 represents the used amount (ejection amount) of each ink discharged on the printing medium for representing the image by the image forming unit 107. The conversion unit 1601 can use known scheme such as a matrix operation process, or a process that uses a three-dimensional Look-Up Table (LUT) for the aforementioned conversion.

Here, the input image may be an image (CMYK image) in which pixels each including pixel values of the C, M, Y and K, without being limited to an RGB image in which pixels each having pixel values of the R, G and B (i.e., each pixel including RGB values). Also in such a case, however, it is desirable to perform a process in which the conversion unit 1601 uses a four-dimensional LUT to convert the C, M, Y and K in the input image (CMYK image) into respectively different C', M', Y' and K', in order to limit the total amount of ink and perform color management.

The correction unit 1602 performs a correction process in order to stabilize color against change over time. More specifically, the correction unit 1602 performs a gamma correction process on the CMYK image output from the conversion unit 1601, using a correction table having registered therein signal values (pixel values) for correction target of each module or nozzle. FIG. 5 illustrates an example of the color correction table according to the present embodiment. The correction table illustrated in FIG. 5 is a correction table used for performing conversion on head-module-by-head-module basis.

The correction table illustrated in FIG. 5 has stored therein corrected color signal values corresponding to the input color signal values (0, 16, 32, . . . , 240, 255) for the head modules 201a, 201b and 201c in the print head 201, the head modules 202a, 202b and 202c in the print head 202, and the head modules 203a, 203b and 203c in the print head 203, respectively. For example, when the pixel value (input color signal value) of a pixel of color K corresponding to the head module 201a of the print head 201 is 32, the correction unit 1602 changes the pixel value of the pixel to 28.

The present embodiment thus performs the correction process by referring to respective correction tables for C, M, Y and K. As such, density change can be canceled by correcting the CMYK image representing the ejection amount. Although FIG. 5 illustrates a single correction table collectively listing respective conversions for C, M, Y and K, it may be interpreted as a set of correction tables for C-ink, M-ink, Y-ink and K-ink.

Note that, when performing the correction process on chip-module-by-chip-module basis or nozzle-by-nozzle basis instead of head-module-by-head-module basis, the correction table includes as many columns as the number of chip modules or nozzles.

Here, in the correction table illustrated in FIG. 5, an input color signal value not existing in the LUT is calculated from a neighboring input color signal value stored in the LUT, employing an interpolation process. It is needless to say that converted color signal values may be stored corresponding to all the input color signal values, without employing the interpolation process. Alternatively, the correction processing can be performed referring to other types of correction information such as function conversion or matrix conversion instead of the correction table.

Returning to FIG. 3, an HT (halftone) processing unit 1603 generates a halftone image by converting (HT processing) a CMYK image already subjected to the correction process by the correction unit 1602 into a CMYK image whose number of gradation levels can be directly represented by the image forming unit 107. In the present embodiment, "number of gradation levels that can be directly expressed by the image forming unit 107" refers to be binary that is an ink dot being ON or OFF. Specifically, in other words, an image of 8-bit per pixel is converted into a half-tone image of 1-bit binary having either 0 or 1 per pixel. In the present embodiment, the HT processing uses a known method such as dither processing. With a threshold matrix required for dither processing preliminarily generated and stored in the external storage apparatus 105, it can be read from the external storage apparatus 105 and used as necessary. Here, other schemes such as error diffusion is also applicable in place of dither processing.

The HT processing unit 1603 then outputs the halftone image generated from the CMYK image as described above to the image forming unit 107, and causes the image forming unit 107 to print the halftone image on a printing medium.

The image acquisition unit 108 acquires RGB values for each pixel by reading, as described above, a formed image 400 printed on a printing medium by the image forming unit 107 (image printed on a printing medium (image formed) in accordance with the halftone image generated by the HT processing unit 1603).

A color conversion unit 1604 reads a color conversion matrix 1607 (matrix described above) stored in the external storage apparatus 105. The color conversion unit 1604 then uses the read-out color conversion matrix 1607 to calculate a "reflectance ($\rho_c$, $\rho_m$, $\rho_y$) of CMY-ink" corresponding to the RGB values for each pixel acquired by the image acquisition unit 108. The color conversion unit 1604 thus acquires, as a reflectance image, "an image formed of pixels having the "reflectance ($\rho_c$, $\rho_m$, $\rho_y$) of CMY-ink" corresponding to the RGB values for each pixel acquired by the image acquisition unit 108".

An identification unit 1605 identifies the ink color used for each region of the reflectance image acquired by the color conversion unit 1604, based on the CMYK image acquired by the conversion unit 1601. A generation unit 1606 generates a correction table to be used by the correction unit 1602, referring to the reflectance image acquired by the color conversion unit 1604 and the region in the reflectance image performed by identification. Target density characteristics 1608 referred to by the generation unit 1606 will be described below.

When the resolution of the read-out image acquired by the image acquisition unit 108 and the resolution of the aforementioned CMYK image are different, it is desirable to perform resolution conversion of the read-out image so that both resolutions match. Known approaches such as the nearest neighbor method, bilinear interpolation, bicubic interpolation may be used for resolution conversion.

In addition, when there is significant skew of the printing medium or aberration of the spectral sensor, it is desirable to perform geometric correction of the sensor output values. Known methods of affine transformation or projection transformation can be used for geometric correction. In such a case, the image processing unit 106 must include a processing unit configured to perform resolution conversion and geometric correction. Alternatively, the sensor output value may be output to the color conversion unit 1604 after the image acquisition unit 108 has performed resolution conversion or geometric correction in each of a predetermined number of lines when acquiring a raster image by the image acquisition unit 108. Additionally, the image forming unit 107 on this occasion may form an image on the printing medium, with providing a marker that facilitates the aforementioned conversion.

<Printing User Image and Generating Correction Table>

Next, there will be described printing of a user image and generation of a correction table by the image forming system according to the present embodiment, referring to a flowchart in FIG. 4. The user operates the operation unit 103 to specify the file name (path name) of the image to be printed (user image) among the images stored in the external storage apparatus 105, as well as the number of sheets to be printed (number of prints). Therefore, at step S401, the CPU 100 acquires the printing content including the file name and the number of prints of the user image specified by the user.

At step S402, the conversion unit 1601 acquires from the external storage apparatus 105, as an input image, an image (user image) having a file name included in the printing content acquired by the CPU 100. In the following, it is assumed that the user image is an "RGB 8-bit format image" in which pixel values of R, G and B of each pixel are represented by 8 bits. At step S403, the conversion unit 1601 converts the user image acquired at step S402 into a CMYK image as described above.

At step S404, the CPU 100 determines whether or not to perform the correction process on density conversion. When, as a result of the determination, the correction process is to be performed on density conversion, the process proceeds to step S405, when the correction process is not to be performed on density conversion, the process proceeds to step S406.

The present embodiment determines not to perform the correction processing on density conversion in the first print, but to perform the correction process on density conversion in the second and subsequent print (print with an image formed on the printing medium).

At step S406, the HT processing unit 1603 generates a 1-bit binary half-tone image in which pixels each having a value of either zero or one, by performing the aforementioned HT processing on a target image that is either the CMYK image converted at step S403 or the CMYK image corrected at step S405.

At step S407, the HT processing unit 1603 outputs the halftone image generated at step S406 to the image forming unit 107 and causes the image forming unit 107 to print on the printing medium (form an image of) the halftone image as the formed image 400.

At step S408, the image acquisition unit 108 acquires RGB values for each pixel by reading the formed image 400 printed on the printing medium by the image forming unit 107 at step S407.

At step S409, the CPU 100 determines whether or not the user image has been printed (printing specified by the user has been completed) as many as the number of prints included in the aforementioned printing content.

Figure 4:
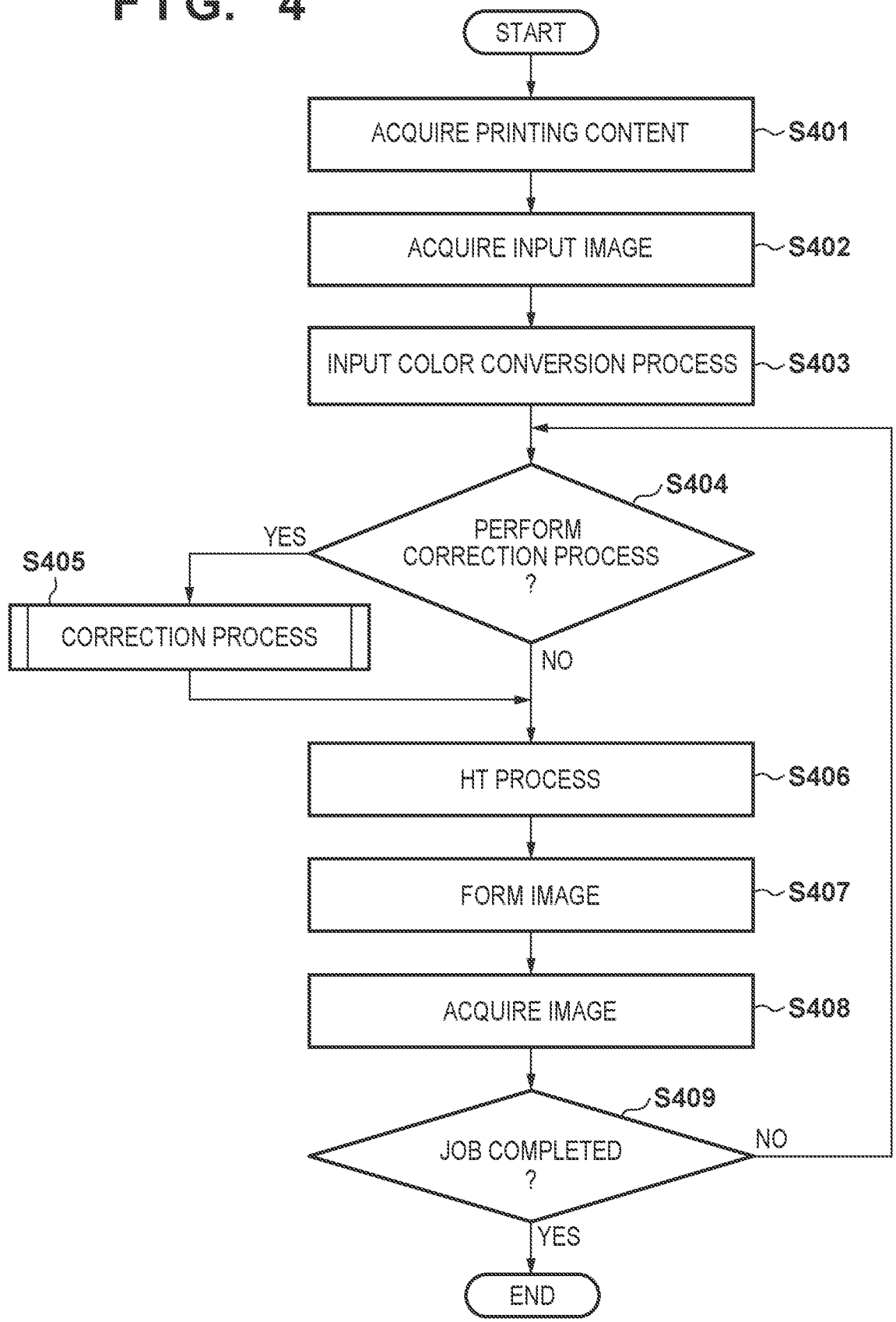
FIG. 4 is a flowchart of printing a user image and generating a correction table.

When, as a result of the determination, printing of the user image has been performed as many as the number of prints included in the aforementioned printing content, the process according to the flowchart in FIG. 4 is terminated. When, on the other hand, printing of the user image has been performed by a smaller number of times than the number of prints included in the aforementioned printing content, the process proceeds to step S404. Here, the first print in which the correction process is not performed may be excluded from the number of prints as a test print. In addition, the process according to the flowchart of FIG. 4 may also be terminated when the user has operated the operation unit 103 to input an instruction to cancel the printing.

Figure 6:
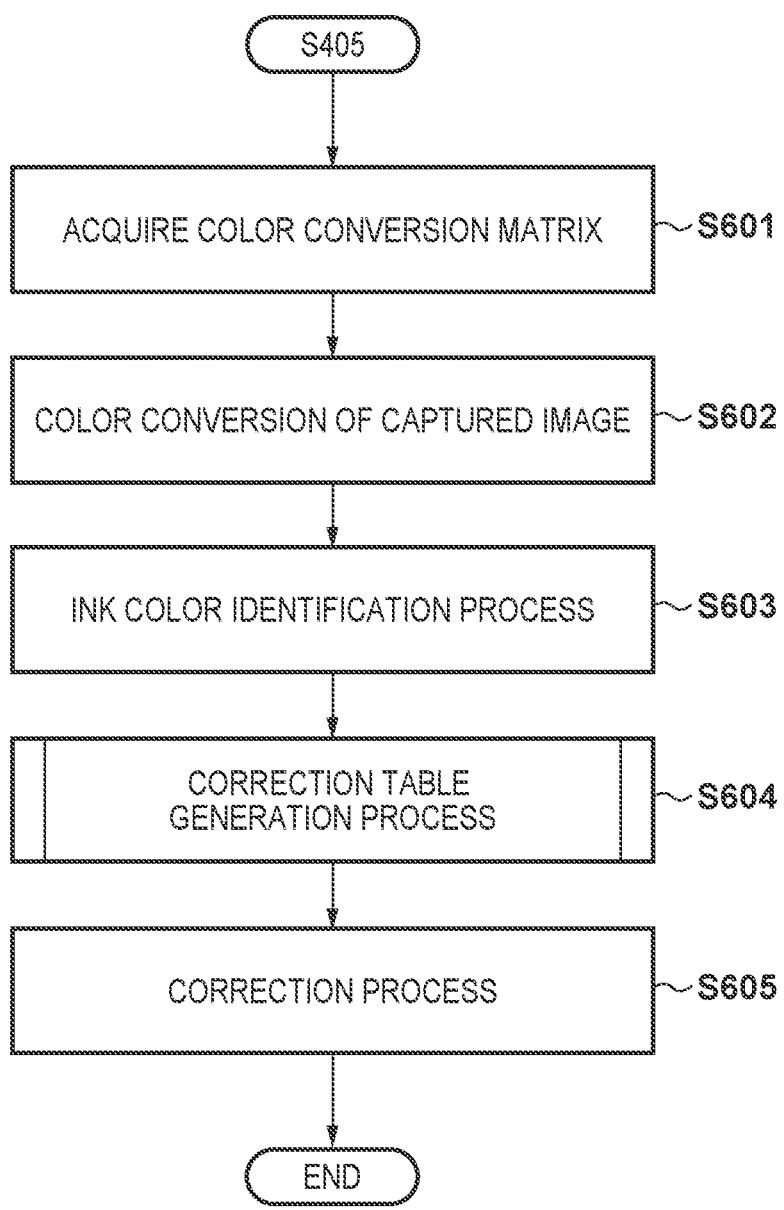
FIG. 6 is a flowchart illustrating details of the processing at step S405.

At step S405, a correction process is performed for color stabilization that stabilizes density change. Details of the processing at step S405 will be described, referring to the flowchart in FIG. 6.

At step S601, the color conversion unit 1604 reads, from the external storage apparatus 105, the color conversion matrix 1607 preliminarily generated before printing. The color conversion matrix 1607 is a color conversion matrix used for converting the sensor output values (RGB values (output values of R, G and B) output by the image acquisition unit 108 at step S408 into a dimension (color space) in which the correction process is performed for color stabilization. The color space for performing the correction process can be any color space related to the density over the formed image 400. In the present embodiment, description will be made using a reflectance at a certain wavelength corresponding to the CMY on the printing medium. Here, other examples of the color space may include optical density, luminance, brightness, or the like.

Next, the color conversion matrix 1607 will be described. Various arithmetic processing for calculating the color conversion matrix 1607 may be performed by any of the CPU 100, the image processing unit 106, or an apparatus or system separate from the image forming system according to the present embodiment. In addition, the color conversion matrix 1607 calculated (generated) by various arithmetic processing described below is stored in the external storage apparatus 105. Here, the destination to store the color conversion matrix 1607 is not limited to the external storage apparatus 105, and the color conversion matrix 1607 may be stored in other apparatuses that can communicate with the image forming system such as an external apparatus that can communicate with the image forming system via the I/F unit 109.

Figure 7:
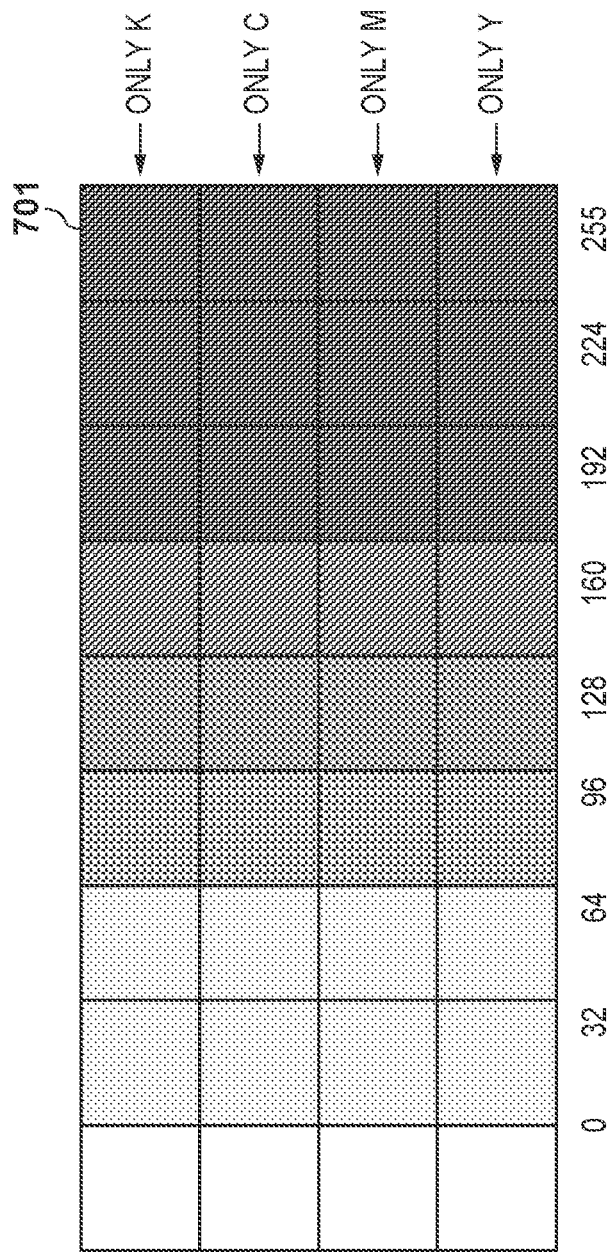
FIG. 7 is a diagram illustrating an example of a uniform pattern.

The present embodiment first outputs and reads the dedicated chart including a uniform pattern of single-color of each ink, prior to printing of the user image. An example of the uniform pattern is illustrated in FIG. 7. FIG. 7 illustrates a patch image 701 as the uniform pattern.

The first patch row in the patch image 701 indicates respective patches of different signal values (i.e., ejection amounts) printed with K-ink only. In the first row, patches of K-ink respectively corresponding to signal values 0, 32, . . . , 255 are arranged from the left end to the right end.

The second patch row in the patch image 701 indicates patch columns each having different signal values (i.e., ejection amounts) printed with C-ink only. In the second row, patches of C-ink respectively corresponding to signal values 0, 32, . . . , 255 are arranged from the left end to the right end.

The third patch row in the patch image 701 indicates patch columns each having different signal values (i.e., ejection amounts) printed with M-ink only. In the third row, patches of M-ink respectively corresponding to signal values 0, 32, . . . , 255 are arranged from the left end to the right end.

The fourth patch row in the patch image 701 indicates patch columns each having different signal values (i.e., ejection amounts) printed with Y-ink only. In the fourth row, patches of Y-ink respectively corresponding to signal values 0, 32, . . . , 255 are arranged from the left end to the right end.

Although FIG. 7 illustrates an example of nine patch patterns per color, the number of patches is not limited thereto. In addition, also the arrangement of the patch patterns of each ink color is not limited to that illustrated in FIG. 7.

In the present embodiment, an RGB value (the RGB value read by the image acquisition unit 108) for each of the ejection amounts is acquired by printing such a uniform pattern on a printing medium by the image forming unit 107, and reading, by the image acquisition unit 108, the printing medium (uniform pattern) thus printed.

Furthermore, the aforementioned uniform pattern is read again or simultaneously read (with the aforementioned reading) by a known colorimeter that can acquire spectral information, so as to acquire the spectral reflectance characteristic $\rho$ with respect to the used amount (ejection amount) of each ink.

Next, the color conversion matrix to be used for converting an RGB value into reflectance of each of the CMY ink colors. Specifically, the wavelength for each ink color is first determined from the spectral reflectance characteristic of each of the CMY ink colors. A wavelength that is representative and characteristic of each color ink (representative wavelength) is selected as the aforementioned wavelength. For example, wavelengths of 650 nm, 550 nm, and 450 nm are selected as the representative wavelengths of C-ink (ink of color C), M-ink (ink of color M), and Y-ink (ink of color Y), respectively.

Next, the change of the reflectance with respective to the ejection amount of each color ink is acquired from the output result of the aforementioned colorimeter as the spectral reflectance characteristics (reflectance) $\rho_c(k_c)$, $\rho_m(k_m)$, $\rho_y(k_y)$, for each of the representative wavelengths of C, M and Y.

Here, L (where x=c, m, y) represents the ejection amount of an ink color x, and $\rho_x(k_x)$ represents the reflectance at the representative wavelength defined for each ink color x when the ejection amount of the ink color x is $k_x$. The ejection amount, which is denoted by [%], indicates the ratio of discharged dots within each pixels of 1200-dpi of nozzle resolution. For example, an ejection amount $k_c$=100 [%] indicates that C-ink is discharged in all the pixels within the nozzle resolution, and $\rho_c(100)$ represents the reflectance at the representative wavelength 650 nm of the ink color C.

Subsequently, an equation described below is formulated from the acquired reflectance $\rho_x(k_x)$ and the RGB values read by the image acquisition unit 108 from the uniform pattern. Here, Rx($k_x$), Gx($k_x$) and Bx($k_x$) are the RGB values for the ejection amount $k_x$ of the ink color x. First, the following Equation 1 is formulated, focusing on the representative wavelength of the ink color C in the uniform pattern of the ink color C (i.e., x=c).

$$\begin{cases} \rho_c(0) = a \cdot R_c(0) + b \cdot G_c(0) + c \cdot B_c(0) \\ \rho_c(32) = a \cdot R_c(32) + b \cdot G_c(32) + c \cdot B_c(32) \\ \rho_c(64) = a \cdot R_c(64) + b \cdot G_c(64) + c \cdot B_c(64) \\ \vdots \quad \vdots \quad \vdots \quad \vdots \quad \vdots \\ \rho_c(255) = a \cdot R_c(255) + b \cdot G_c(255) + c \cdot B_c(255) \end{cases} \quad \text{[Equation 1]}$$

Each row in Equation 1 is a linear combination of the RGB values using unknown coefficients a, b and c, for a patch with a certain ejection amount. Here, the coefficients a, b and c are common to all the rows. Here, Equation 1 is abbreviated as the following Equation 2, denoting the ejection amount by the variable $k_c$.

$$\rho_c(k_c) = a \cdot R_c(k_c) + b \cdot G_c(k_c) + c \cdot B_c(k_c) \quad \text{[Equation 2]}$$

Equation 1 and Equation 2 represent the same equation. Next, the following Equation 3 is formulated, similarly focusing on the representative wavelength of the ink color C in the uniform pattern of the ink color M.

$$\begin{cases} 1 = a \cdot R_m(0) + b \cdot G_m(0) + c \cdot B_m(0) \\ 1 = a \cdot R_m(32) + b \cdot G_m(32) + c \cdot B_m(32) \\ 1 = a \cdot R_m(64) + b \cdot G_m(64) + c \cdot B_m(64) \\ \vdots \quad \vdots \quad \vdots \quad \vdots \quad \vdots \\ 1 = a \cdot R_m(255) + b \cdot G_m(255) + c \cdot B_m(255) \end{cases} \quad \text{[Equation 3]}$$

The difference from Equation 1 is that all the reflectance values on the left side are replaced by 1 in place of measured value, and the RGB values on the right side are replaced by $R_m$, $G_m$ and $B_m$, which are values for the patches of the ink color M. The unknown coefficients a, b and c represent the same coefficients as Equation 1. Equation 3 is also abbreviated as the following Equation 4, similarly to Equation 2.

$$1 = a \cdot R_m(k_m) + b \cdot G_m(k_m) + c \cdot B_m(k_m) \quad \text{[Equation 4]}$$

Furthermore, an equation similar to Equation 3 is formulated, focusing on the wavelength of the ink color C in the uniform pattern of the ink color Y. Since the procedures are similar, only those abbreviated are expressed as the following Equation 5.

$$1 = a \cdot R_y(k_y) + b \cdot G_y(k_y) + c \cdot B_y(k_y) \quad \text{[Equation 5]}$$

The common unknown coefficients a, b and c appearing in Equation 2, Equation 4 and Equation 5 can be collectively written in a matrix form such as the following Equation 6.

$$\begin{pmatrix} \rho_c(k_c) \\ 1 \\ 1 \end{pmatrix} = \begin{pmatrix} R_c(k_c) & G_c(k_c) & B_c(k_c) \\ R_m(k_m) & G_m(k_m) & B_m(k_m) \\ R_y(k_y) & G_y(k_y) & B_y(k_y) \end{pmatrix} \begin{pmatrix} a \\ b \\ c \end{pmatrix} \quad \text{[Equation 6]}$$

Now, the meaning of the equations formulated in the foregoing description will be explained. Equation 2 is an equation indicating that a linear combination of the RGB values for each ejection amount of the single-color C-ink (single-color printing material) will be equal to the measured reflectance of the representative wavelength of the ink color C at that time. This represents an assumption with regard to the reproducibility that the reflectance can be calculated from the RGB values read by the image acquisition unit 108. a, b and c are coefficients for the RGB values at that time.

On the other hand, Equation 4 and Equation 5 indicate that the linear combinations of the RGB values using the coefficients a, b, and c described above in the single-color C-ink are, for the C-ink wavelength reflectance of M-ink and Y-ink, constantly one. In other words, the linear combination of the RGB values read by the image acquisition unit 108, and the coefficients a, b and c is intended to represent the representative wavelength of C-ink, and neither responds to input of the RGB values acquired by reading M-ink and Y-ink, nor has any light absorption (non-reflective) component with respect to the representative wavelength of C-ink. Whereas Equation 2 has the measured value $\rho_c(k_c)$ on its left side, the value one on the left side of Equation 4 and Equation 5 is an assumption, which works as a conceptual constraint condition.

Equation 6, accommodating the reproducibility of Equation 2 and the constraint condition of Equation 4 and Equation 5, can be used to calculate an approximate solution for the vector (a, b, c) with a minimized error. The coefficients a, b and c acquired in the aforementioned manner can be used to newly formulate a linear combination of the RGB values.

$$\rho'_c(k_c) = a \cdot R_c(k_c) + b \cdot G_c(k_c) + c \cdot B_c(k_c) \quad \text{[Equation 7]}$$

The left side $\rho'_c(k_c)$ acquired by the Equation 7 differs from pure reproduction of the original $\rho_c(k_c)$ in that not only the measured values but also the meaning of the constraint condition is included in Equation 6 whose approximate solution has been calculated, and therefore tends to have more directional and selective characteristics for the representative wavelength of C-ink. Conversion into reflectance with such characteristics thus works effectively on user image that may include not only single-color ink but also ink of any color as the target, unlike the dedicated chart. In practice, it is possible to formulate similar equations for the representative wavelengths of M-ink, and Y-ink, besides C-ink. A matrix X of 3×3 is set to include the coefficient sets representing the representative wavelengths of M-ink and Y-ink as coefficient matrix in place of the coefficient set (a, b, c) for the representative wavelength of C-ink, and the matrix X, which is the color conversion matrix 1607, is acquired by approximately solving the following Equation 8.

$$\begin{pmatrix} \rho_c(k_c) & 1 & 1 \\ 1 & \rho_m(k_m) & 1 \\ 1 & 1 & \rho_y(k_y) \end{pmatrix} = \begin{pmatrix} R_c(k_c) & G_c(k_c) & B_c(k_c) \\ R_m(k_m) & G_m(k_m) & B_m(k_m) \\ R_y(k_y) & G_y(k_y) & B_y(k_y) \end{pmatrix} X \quad \text{[Equation 8]}$$

Multiplying the color conversion matrix 1607 acquired through the arithmetic operation according to respective equations described above by the RGB value read by the image acquisition unit 108 allows for acquiring a color space, $\rho'_c(k_c)$, $\rho'_m(k_m)$, $\rho'_y(k_y)$, which is a directional reflectance for performing the correction process. In the following, these will be referred to as directional reflectance.

The color space for performing correction process is not limited to the aforementioned (directional) reflectance, and it may also be configured to perform matrix conversion on the R'G'B' acquired by performing 1DLUT or logarithmic conversion on the RGB values. When, for example, performing an estimation process using x-ink density $d_x$ (x=c, m, y) acquired through logarithmic conversion of the ratio of reflectance, a matrix X, associating the RGB values with the density $d_x$ according to the following Equation 9, may be used as the color conversion matrix 1607.

$$\begin{pmatrix} d_c(k_c) & 0 & 0 \\ 0 & d_m(k_m) & 0 \\ 0 & 0 & d_y(k_y) \end{pmatrix} = \begin{pmatrix} R_c(k_c) & G_c(k_c) & B_c(k_c) \\ R_m(k_m) & G_m(k_m) & B_m(k_m) \\ R_y(k_y) & G_y(k_y) & B_y(k_y) \end{pmatrix} X \quad \text{[Equation 9]}$$

Note that, in Equation 9, a density value zero is set to the value at a wavelength different from the ink color on the left-side being the constraint condition, in place of the reflectance value one in Equation 8. In addition, the matrix side may include a second-order or third-order term of the RGB values, and the matrix X according to the following Equation 10 can be used, for example.

$$\begin{pmatrix} \rho_c(k_c) & 1 & 1 \\ 1 & \rho_m(k_m) & 1 \\ 1 & 1 & \rho_y(k_y) \end{pmatrix} =$$

$$\begin{pmatrix} R_c(k_c) & G_c(k_c) & B_c(k_c) & R_c(k_c)^2 & G_c(k_c)^2 & B_c(k_c)^2 \\ R_m(k_m) & G_m(k_m) & B_m(k_m) & R_m(k_m)^2 & G_m(k_m)^2 & B_m(k_m)^2 \\ R_y(k_y) & G_y(k_y) & B_y(k_y) & R_y(k_y)^2 & G_y(k_y)^2 & B_y(k_y)^2 \end{pmatrix} X \quad \text{[Equation 10]}$$

In the case of Equation 10, the size of the matrix X is six rows and three columns. Multiplying the RGB value by this matrix X allows for acquiring $\rho'_c(k_c)$, $\rho'_m(k_m)$, $\rho'_y(k_y)$ in the same manner.

Basically, it suffices to generate the color conversion matrix 1607 preliminarily at least once for each condition such as type of printing medium, and reading by the spectral sensor or calculation of the aforementioned approximation solution is not required each time printing is performed. Each time printing is performed, the preliminarily generated color conversion matrix 1607 is read and a matrix multiplication on the acquired RGB values is performed using the color conversion matrix 1607. Therefore, it becomes possible to perform color stabilization at a higher speed or with a lower cost when reading by the spectral sensor or the calculation process is constraint for cost or speed.

Returning to FIG. 6, at step S602, a user image, i.e., a read-out image (RGB sensor output value) read by the image acquisition unit 108 from the printing medium at the previous step S408 is converted into directional reflectance using the color conversion matrix 1607 acquired at step S601.

The present embodiment attempts to increase the accuracy of correction by setting a directional reflectance, in which a specific wavelength is provided with directional characteristics, as a color space to be corrected, as has been described above. However, the conversion coefficient calculated based on Equation 8 is based on an approximate solution and therefore it is difficult to completely eliminate effects of other wavelengths from the wavelength of interest. In particular, that goes for a mixed color, among others. Generally or qualitatively, various elements are involved in color development by mixing multiple colors on a printing medium, and it is more difficult to accurately determine therefrom density change in a single ink.

The present embodiment therefore performs a process as described below in order to further improve the correction accuracy. In other words, when there exists a region in a user image in which an image is formed using single-color ink, density change in the ink is determined therefrom. For ink colors used for the other mixed colors, characteristic calculation is performed using the density change determined from the single-color region.

Specifically, at step S603, the identification unit 1605 identifies, for each pixel in the user image, which ink has been used to form the user image on the printing medium. For example, the identification unit 1605 can determine by referencing pixel values (signal values of C, M, Y and K) of each pixel in a CMYK image converted from the user image. When the pixel value of C among the pixel values of C, M, Y and K of a pixel of interest in the CMYK image is not zero (or equal to or larger than a predefined value) and the pixel values of M, Y and K are zero (or lower than a predefined value), the pixel of interest can be identified as being formed of C-ink only (single-color). It is therefore possible to determine in this case that the pixel corresponding to the corresponding pixel of interest in the user image is formed of C-ink only.

Figure 8:
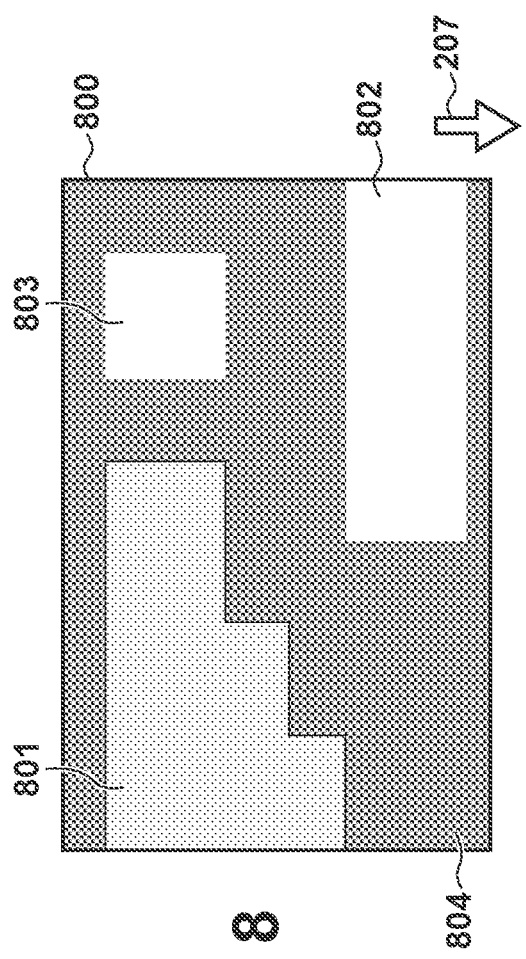
FIG. 8 is a diagram illustrating a result of identification of a CMYK image performed by an identification unit 1605.

The result of identification performed on the CMYK image by the identification unit 1605 is illustrated in FIG. 8. The region 801 in the CMYK image 800 is a pixel region including C-pixels identified as pixels formed of C-ink only. In addition, the region 802 in the CMYK image 800 is a pixel region including M-pixels identified as pixels formed of M-ink only. In addition, the region 803 in the CMYK image 800 is a pixel region including white pixels identified as pixels for which any type of ink has not been used. In addition, the region 804 in the CMYK image 800 is a pixel region including multicolor pixels identified as pixels formed of multicolor (two or more colors) ink. It is assumed that the CMYK image 800 in FIG. 8 is formed in the direction indicated by the arrow 207 on the printing medium.

At step S604, the generation unit 1606 generates the aforementioned correction table to be used by the correction unit 1602. Details of the processing at step S604 will be described, referring to the flowchart of FIG. 9.

Figure 9:
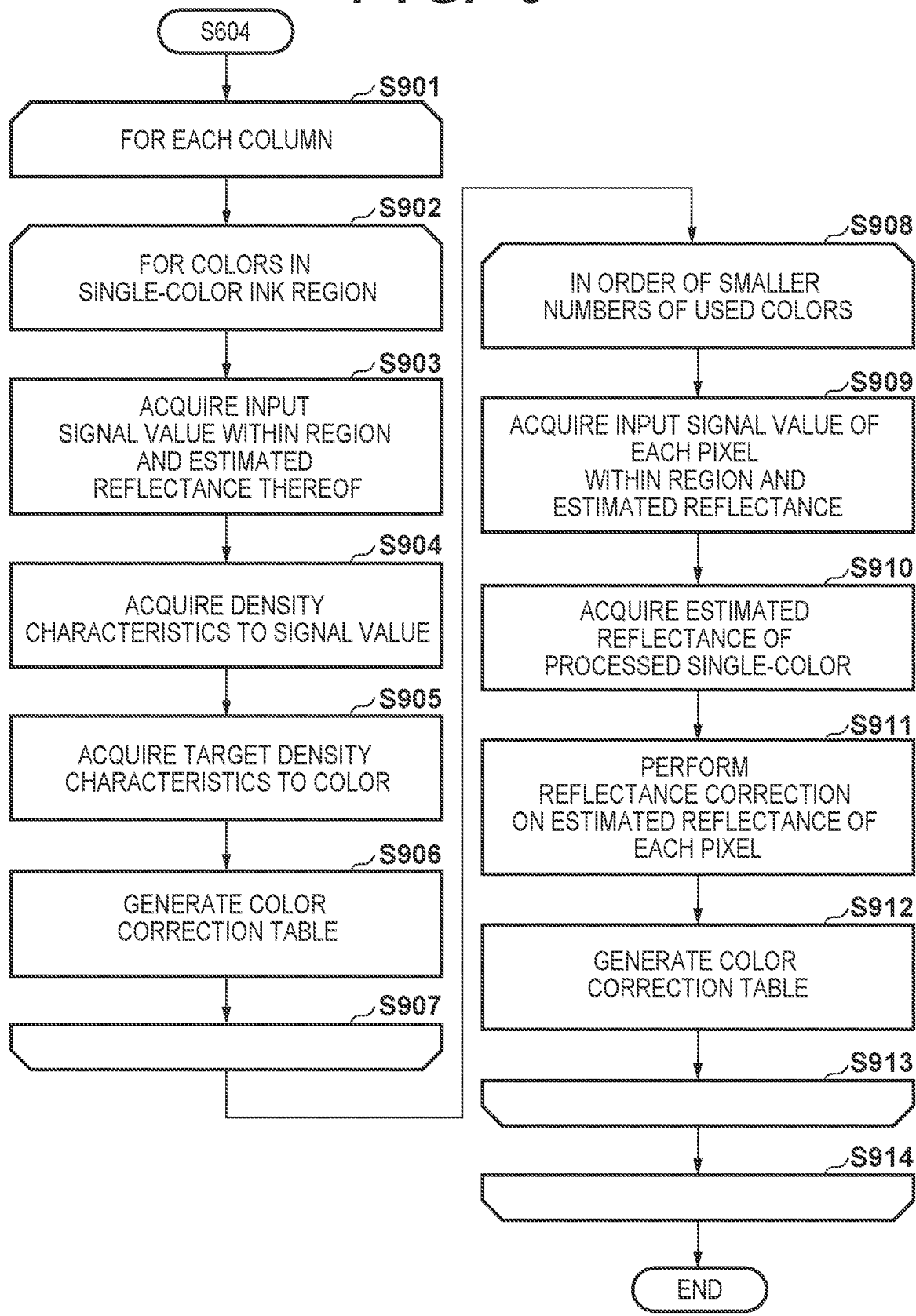
FIG. 9 is a flowchart illustrating details of the processing at step S604.

In the process according to the flowchart of FIG. 9, the processing from step S901 to step S914 is performed on the entire image by units subjected to the correction process. It is assumed in the present embodiment to perform the correction process on a nozzle-by-nozzle basis (units), and the processing from step S901 to step S914 is performed on each nozzle (each column).

In addition, the processing from step S902 to step S907 is repeated for colors in all the single-color regions in the column identified at step S603. From step S902 to step S907, estimation of the density characteristics of the primary color and generation of the correction table are performed.

Figure 10:
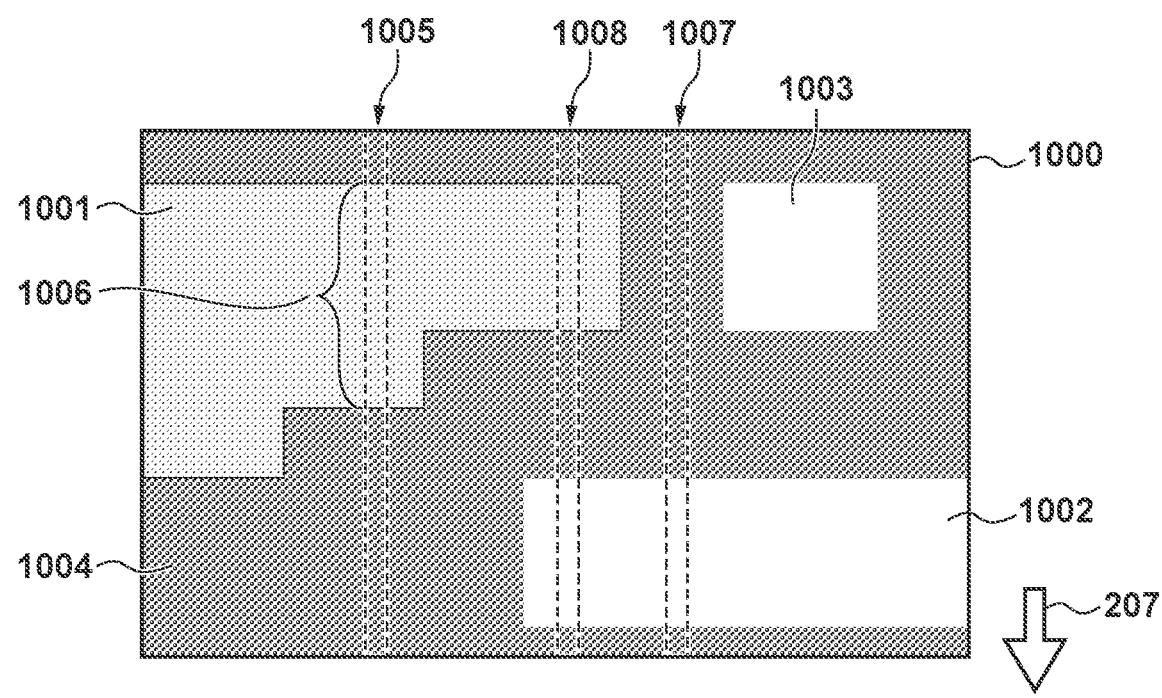
FIG. 10 is a diagram illustrating an example of an image including a pixel expressed by an RGB value acquired at step S408.

It is assumed in the present embodiment that the image formed of pixels representing the RGB values acquired at step S408 is acquired with the same size and same resolution as those of the CMYK image. An example of the image formed of pixels of the RGB values acquired at step S408 is illustrated in FIG. 10. The CMYK image of an image 1000 in FIG. 10 corresponds to the CMYK image 800 in FIG. 8. The regions 801, 802, 803 and 804 in FIG. 8 respectively correspond to the regions 1001, 1002, 1003 and 1004 in FIG. 10.

Here, it is assumed that a column 1005 is the nozzle column of interest to be processed. Here, a region 1006, in the column 1005, is a region overlapping with the region 1001 on the image 1000 corresponding to the single-color region 801 identified at step S603.

Figure 11A:
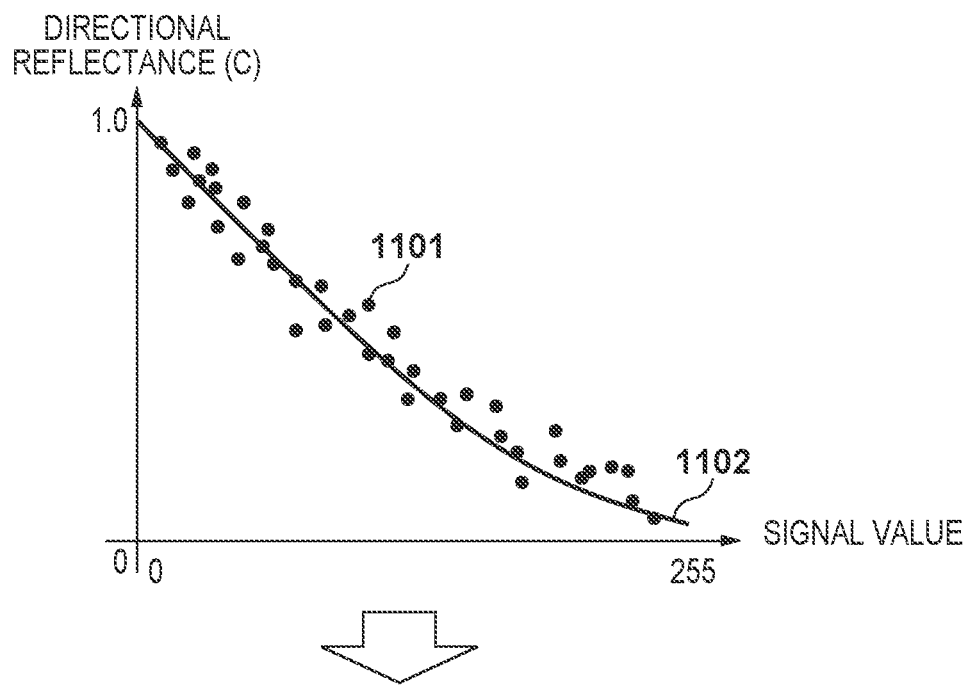
FIGS. 11A and 11B are plot diagrams of a relation between a signal value and a directional reflectance.
Figure 11B:
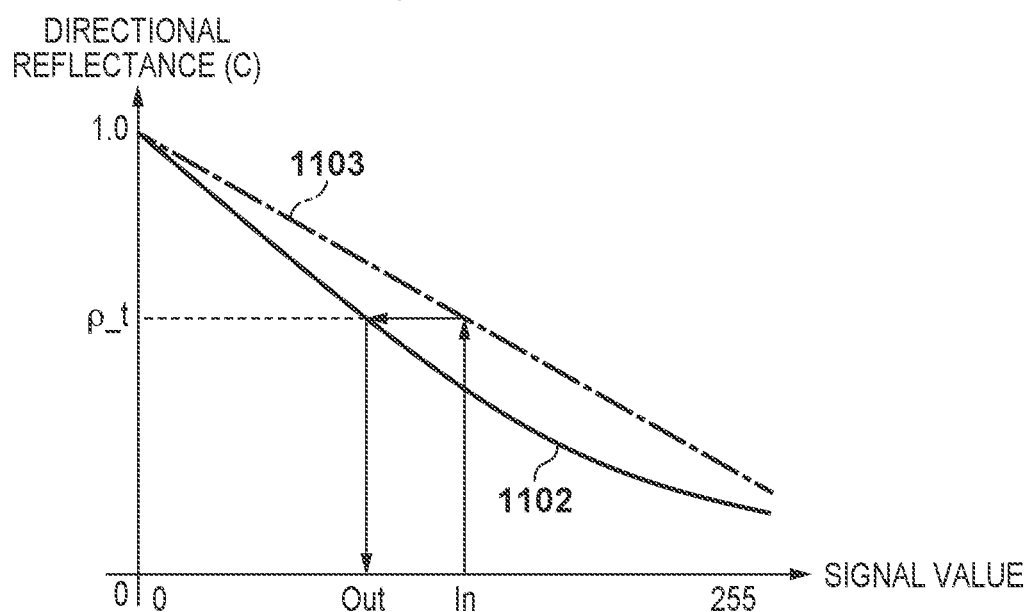

At step S903, the generation unit 1606 acquires, for each pixel in the region 1006, the pixel value of the corresponding pixel in the CMYK image corresponding to the pixel (signal value of the ink used) in association with the corresponding directional reflectance calculated at step S602. FIGS. 11A and 11B are plot diagrams illustrating the relation between the signal value and the directional reflectance acquired as described above. The horizontal axis of FIGS. 11A and 11B is the signal value of the single ink in the CMYK image, and is the signal value of C in this case. On the other hand, the vertical axis is the reflectance of the color corresponding to the signal value, among the set of estimated reflectance of each ink, and is the reflectance of the wavelength of C in this case. Each point of the plots 1101 in FIG. 11A corresponds to one pixel in the region 1006.

Subsequently, at step S904, the generation unit 1606 estimates the density characteristics to the signal value based on the signal value and the directional reflectance of each pixel in the region 1006. The density characteristics mentioned here are those representing the density on the printing medium, and described in terms of reflectance in the present embodiment. A curve 1102 in FIG. 11A indicates the density characteristics calculated based on respective points in the aforementioned plots.

The curve 1102 can be derived by fitting polynomial coefficients acquired by the least square method to the plots 1101, in a polynomial function of a predetermined order, for example. An exponential equation (in the form of $y=x^a$, where ^ denotes exponentiation symbol) may be used instead of a polynomial. Alternatively, the curve can also be acquired by averaging plots included in each section of a certain constant number (e.g., 16 or 32) of signal values to acquire representative values of reflectance and signal values for each section, and subsequently performing an interpolation operation on the representative values for each section. On this occasion, an interpolation method such as piecewise linear interpolation or spline curve may be used, for example.

Here, the relation between the signal value and the directional reflectance can be depicted in a similar manner with the directional reflectance along the vertical axis being M-wavelength (wavelength of M) or Y-wavelength (wavelength of Y), while the signal value along the horizontal axis is still color C. For subsequent steps, relations with regard to M-wavelength and Y-wavelength are also acquired (not illustrated).

Subsequently, at step S905, the generation unit 1606 acquires target density characteristics 1608, which will be target density characteristics. The target density characteristics 1608 are preliminarily stored design values, in which color densities to be output by the image forming unit 107 on the printing medium corresponding to the CMYK signal values are described by a color space (reflectance, in this case) for performing correction process. FIG. 11B illustrates target density characteristics 1608 as a curve 1103 together with the curve 1102 indicating the density characteristics acquired at step S904. The difference between the curves reveals that an image, which should be output by the image forming unit 107 with density characteristics as indicated by the curve 1103, is reproduced in a displaced manner like the curve 1102 due to aging of piezo elements or heaters of nozzles, or ambient environment such as temperature and humidity.

At step S906, the correction table generation unit 1606 refers to a curve 1103 indicating the target density characteristics 1608 and a curve 1102 indicating the actual density characteristics, and generates a correction table (FIG. 5) for correcting the curve 1102 to the characteristics of the curve 1103. In order to generate the correction table, as illustrated in FIG. 11B, a set of a certain input color signal value In and a target reflectance ρ_t corresponding thereto is first calculated from the curve 1103. Next, an output color signal value "Out" corresponding to the target reflectance ρ_t is acquired from the actual curve 1102. In other words, although the target reflectance ρ_t should be realized for the input color signal value In according to the design value, the target reflectance ρ_t is not realized for the input signal value In when conforming to the actual curve 1102. Since the signal value Out actually realizes the target reflectance ρ_t, correcting the input color signal value In to the signal value Out realizes the reflectance ρ_t as defined by the design value. In the foregoing manner, a table storing the acquired input color signal value In in association with the output color signal value Out is generated as the correction table. The table in FIG. 5 has stored therein input color signal values In=0, 16, . . . , 240, 255 in association with the output color signal values Out (correction values) acquired for the input color signal values. Alternatively, correction values may be calculated for all of the input color signal values 0 to 255, and stored as a table for nozzles of interest. In other words, the interval between the input color signal values to be registered in the correction table is not limited to a specific interval.

In the example described above, a primary color estimation process has been described focusing on the column 1005 in FIG. 10. In the case of other columns, for example a column 1007 in FIG. 10, the same process is performed on a region overlapping with the column in the region 1002 which is single-color region of M instead of C. Additionally, when there exists single-color regions of a plurality of colors as a column 1008, same processes are independently performed on single-color regions of respective colors to generate the correction table.

Next, upon completion of the loop from step S902 to step S907, the process proceeds to step S908. Steps S908 to step S913 is a loop of a process for generating color density characteristics and the correction table for other color, based on the single ink color density characteristics calculated at steps S902 to S907.

The processing from step S908 to step S913 refers to the used ink identified at step S603 in the column 1005, and targeting the regions sequentially in ascending order from a smaller number of types of ink used, among the region using the same types of ink.

In the following, an example of processing a target region will be described, the target region being set to a region in which only ink C and ink M are used at an overlapping region between the column 1005 and the region 1004. On this occasion, the types of ink used are ink C and ink M, i.e., two types of ink are used.

At step S909, the generation unit 1606 acquires, for each pixel in the target region (region in which ink C and ink M are used) similarly to step S903 described above, the pixel value of the corresponding pixel (signal value of the used ink) in the CMYK image corresponding to the pixel in association with the corresponding directional reflectance calculated at step S602. In this case, the signal values of ink C and ink M, and the directional reflectance of C-wavelength (wavelength of C), M-wavelength and Y-wavelength are acquired, for each pixel.

Next, at step S910, the generation unit 1606 acquires the directional reflectance calculated in the aforementioned processing from step S902 to step S907 on the single-color ink (here, C-ink) whose density characteristics has already been calculated.

More specifically, the relation between signal value and directional reflectance for C-ink have been acquired at step S904, and then reference is made to the relation. In other words, the directional reflectance of C-wavelength, M-wavelength and Y-wavelength of C-ink in each pixel is calculated using the signal value of ink C in each pixel in the mixed region of C-ink and M-ink. The directional reflectance of each wavelength calculated in the foregoing manner indicates the directional reflectance for C-ink only.

At step S911, the generation unit 1606 then performs a reflectance correction process to eliminate the effect of the directional reflectance of C-ink calculated at step S910 from the directional reflectance in each pixel calculated at step S909. Specifically, in the present embodiment, the directional reflectance of C-wavelength, M-wavelength and Y-wavelength in the pixel is respectively divided by the directional reflectance of C-wavelength, M-wavelength and Y-wavelength for C-ink only (reflectance correction process). The directional reflectance thus acquired is referred to as corrected directional reflectance here.

The reflectance correction process will be described below. It is assumed in the present embodiment that the reflectance at a wavelength λ, of an image formed on a printing medium is expressed as a product of reflectance at the wavelength λ, of each ink, as will be described below.

Reflectance at a wavelength λ in a formed image=Π (reflectance at wavelength λ of each ink)=(reflectance at wavelength λ of $C$-ink)×(reflectance at wavelength λ of $M$-ink)×(reflectance at wavelength λ of $Y$-ink)×(reflectance at wavelength λ of $K$-ink) (Equation 11)

Since only ink C and M are used in the target region of the above example, reflectance at wavelength λ in the formed image=reflectance at wavelength λ of $C$-ink)× (reflectance at wavelength λ of $M$-ink) (Equation 12)

Therefore, dividing the directional reflectance of the image by the directional reflectance of C allows for calculating the remaining directional reflectance of the M-ink. In other words, the corrected directional reflectance in the aforementioned example estimates the directional reflectance of single-color M-ink.

At step S912, the generation unit 1606 generates a correction table for a new color (M-ink in this example) for which the corrected directional reflectance had been calculated. In other words, it sufficed to generate the correction table by plotting the signal values and the corrected directional reflectance for M-ink and comparing the plots with M-ink target density characteristics, similarly to steps S905 to S906.

The processing on the mixed region of C-ink and M-ink is thus finished. The foregoing process newly acquires a correction table for M-ink in addition to the correction table for C-ink.

Starting from a known single color, the processing from step S908 to step S913 is repeated, sequentially increasing the correction tables. Although an example of a mixed region of C-ink and M-ink has been described here, it is possible to generate a correction table for Y-ink instead of M-ink in the aforementioned processing, provided that there exists a mixed region of C-ink and Y-ink similarly in the column 1005. In addition, when, for example, "a region of C-ink only", "a region of C-ink and M-ink", and "a region of C-ink, M-ink and Y-ink" simultaneously exist in the column 1005 of interest, the process is performed targeting the regions sequentially in ascending order from a smaller number of types of ink used therein, and a correction table is generated for the targeted region. In other words, a correction table for C-ink is first generated at steps S901 to S907 targeting the "region of C-ink only". Subsequently, at steps S908 to S913, new color correction tables are generated increasing the number of colors to be processed one by one, such as first generating a correction table for M-ink targeting the "region of C-ink and M-ink", then generating a correction table for Y-ink targeting the "region of C-ink, M-ink, and Y-ink" and so on. Now that density variation of the color for which a correction table has been generated is known, density variation in the mixed color region including the new color can be acquired by performing correction excluding density variation in the known color. New correction tables are sequentially generated in the aforementioned manner.

Returning to FIG. 6, the correction unit 1602 performs the gamma correction process on the CMYK image at step S605, using the correction table generated at step S604 described above. In other words, gamma correction is performed on the pixel value of C in the CMYK image using the correction table for ink color C, and gamma correction is performed on the pixel value of M in the CMYK image using the correction table for ink color M. Additionally, gamma correction is performed on the pixel value of Y in the CMYK image using the correction table for ink color Y, and gamma correction is performed on the pixel value of K in the CMYK image using the correction table for ink color K.

In the second and subsequent printing, the processing from step S406 to step S407 is performed on the CMYK image subjected to gamma correction at step S405, whereby the formed image 400 can be acquired in a state where density is corrected.

As such, correcting the CMYK image, representing the ejection amount, based on the correction table allows for bringing the density characteristics reproduced by the image forming unit 107 closer to the target density characteristics originally intended to be reproduced, and reducing unintended density change. At the same time, the present embodiment refers to regions formed of a single ink to generate color density characteristics and a correction table of that color, which allows for generating a more accurate correction table without being affected by mutual interference between multiple types of ink. Furthermore, the present embodiment sequentially generates correction tables for regions sequentially in ascending order from a smaller number of colors, referring to the density characteristics acquired by referring to regions formed of single-color ink also when generating color correction tables for other colors, which allows for generating correction tables also suppressing the effect of interference between multiple types of ink in this regard. As such, it is possible to increase the accuracy of density variation correction process according to the present embodiment.

Modification Example of First Embodiment

In the first embodiment, the target density characteristics 1608 has been determined as the density characteristics to be reproduced by correction. However, the density characteristics of one of the nozzles or modules (head module, chip module) may be selected as the target density characteristics 1608, in place of the specified target density characteristics 1608. For example, in the configuration illustrated in FIG. 2B, density characteristics corresponding to the head module 201b located at the very center and the nozzle at the center thereof may be used as the target density characteristics 1608. Alternatively, it is also possible to set the average value of the density characteristics corresponding to all or some of the nozzles (modules) as the target density characteristics 1608. The foregoing setting has an effect in correcting image quality defects appearing as streaky noise which is the difference of printing density in some of the nozzles or modules, although reproducibility of density characteristics with respect to signal values is no longer guaranteed to be desired reproducibility.

In addition, the first embodiment uses directional reflectance as the color space for performing correction, in which directivity at each wavelength is increased by multiplying a matrix. However, use of directional reflectance is not essential. The present embodiment sequentially acquires the density characteristics referring to regions sequentially in ascending order from a smaller number of types of ink used, starting from the single-color ink region, whereby the effect of interference between multiple types of ink is suppressed. Therefore, the reflectance 1 may be replaced with a measured reflectance at each wavelength in Equation 8, for example, to be used an estimated reflectance (without increasing directivity). In addition, in a case where the image acquisition unit 108 is configured not to acquire the RGB image by the RGB sensor but to allow acquisition of reflectance at the wavelength of each type of ink by a spectral sensor, the measured reflectance may be directly used.

Additionally, in the first embodiment, the color space for performing correction may be optical density, luminance, brightness or the like, without being limited to reflectance, as has been described above. From the viewpoint of omitting calculation process, it is also possible to use RGB sensor output values. The aforementioned idea will be outlined below. It is assumed that a region with no ink used is paper white and RGB sensor values of (255, 255, 255) are acquired. It is assumed that a region where C-ink is used with a 100% ejection amount is cyan colored and RGB sensor values of (0, 255, 255) are acquired. In such a case, C-ink is considered to exert the largest effect on the R value, and the R value can be used in place of the reflectance of the C-wavelength described above. The same goes for M-ink and Y-ink. From the aforementioned relation, characteristics related to the reproduction density on the printing medium are derived and corrected. When removing the effect of other known colors in the single-color density characteristics from a mixed color, the decrement from sensor value of the white color is eliminated by subtraction. In comparison with the first embodiment, such a modification example is considered to have a merit that the conversion process to obtain reflectance can be omitted, and a demerit that accuracy of the sensor output value may degrade because the effect of each ink color does not accumulate linearly in the sensor output value.

In addition, although generation of the correction table has been described to be performed each time in the second and subsequent printing, for convenience of explanation in the first embodiment, generation of the correction table need not be performed each time, and may be performed at an interval based on time, number of sheets output, or the like.

The interval may be either regular or irregular. However, in a case where a new single-color region exists for the unit of processing (nozzle, chip module, head module) when processing a new image, it is desirable to generate a correction table without considering the aforementioned interval and perform the correction process using the correction table. Since the accuracy of deriving the density characteristics from the single-color region is higher than from the mixed-color region, the correction table which has not been generated from the single-color region is replaced by a correction table generated from the single-color region as soon as the single-color region is detected. In the case of not generating a new correction table for the same image, the data does not change from the input image to the halftone image, and therefore it suffices to perform image formation based on the same halftone image without performing the correction process (application of the correction table) and HT processing every time according to the foregoing description.

In addition, the first embodiment has been described to set common target density characteristics 1608 for modules and nozzles that are correction units. However, it is also possible to set different target density characteristics 1608 for each module and each nozzle.

Additionally, the correction unit 1602 in the first embodiment has been described to perform the correction process on an input CMYK image. However, similar effects can be acquired by performing a similar correction process on the threshold matrix to be used by the HT processing unit 1603.

Second Embodiment

The image forming unit 107 and the image acquisition unit 108 in FIG. 1 may be connected to the I/F unit 109. In such a case, an image forming system (image processing apparatus) is an apparatus including the CPU 100, the RAM 101, the ROM 102, the operation unit 103, the display unit 104, the external storage apparatus 105, the image processing unit 106, and the I/F unit 109. A computer apparatus such as a personal computer (PC), smartphone, tablet terminal apparatus may be applied to such the image forming system (image processing apparatus).

Such the image forming system (image processing apparatus) supplies an image to be printed to the image forming unit 107 via the I/F unit 109. In addition, such the image forming system (image processing apparatus) acquires an image that has been read from a printing medium by the image acquisition unit 108 via the I/F unit 109.

The numerical values, timing of processing, order of processing, entity of processing, structure/transmission destination/transmission source/storage location or the like of data (information) used in embodiments and modification example described above are taken as an example for providing specific explanation, and are not intended to limit the invention to such an example.

In addition, a part or all of the aforementioned embodiments and modification examples may be used in combination as appropriate. In addition, a part or all of the aforementioned embodiments and modification examples may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-150415, filed Sep. 15, 2021, which is hereby incorporated by reference herein in its entirety.

What is claimed is:

1. An image processing apparatus comprising a generation unit configured to generate correction information for reducing density change in image formation using a printing material including a plurality of colors, wherein
the generation unit generates correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

2. The image processing apparatus according to claim 1, wherein the generation unit generates correction information, corresponding to a single printing material, for a region formed using the single printing material in the read-out image, and subsequent to the generation, generates correction information sequentially in ascending order from a region of a smaller number of printing materials among regions formed using a printing material including a plurality of colors in a read-out image, the correction information corresponding to a printing material for which correction information has not been generated among the printing materials used for the region.

3. The image processing apparatus according to claim 1, wherein the generation unit generates, in a case where there exists a region formed using a new single printing material in the read-out image, correction information corresponding to the new single printing material.

4. The image processing apparatus according to claim 1, further comprising an image forming unit configured to form an image on a printing medium using the printing material including a plurality of colors.

5. The image processing apparatus according to claim 4, wherein
the image forming unit performs image formation using an inkjet system, and
the generation unit generates a correction table for each nozzle, chip module, or head module, through which the image forming unit discharges a printing material.

6. The image processing apparatus according to claim 5, wherein the generation unit defines density characteristics of the nozzle, the chip module, or the head module as target density characteristics, and generates correction information for correcting density characteristics that is based on a signal value of a printing material to the target density characteristics.

7. The image processing apparatus according to claim 1, wherein the generation unit generates correction information for correcting density characteristics that is based on a signal value of a printing material to preliminarily stored target density characteristics.

8. The image processing apparatus according to claim 1, further comprising
a reading unit configured to read an image formed using the printing material including a plurality of colors.

9. The image processing apparatus according to claim 1, further comprising
a correction unit configured to correct, using the correction information, an image corresponding to a color reproduction region in the image formation.

10. An image processing method to be performed by an image processing apparatus, the method comprising
generating correction information for reducing density change in image formation using a printing material including a plurality of colors, wherein, in the generating,
generating correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

11. A non-transitory computer-readable storage medium storing a computer program for causing a computer to function as
a generation unit configured to generate correction information for reducing density change in image formation using a printing material including a plurality of colors, the generation unit generates correction information, sequentially in ascending order from a region of a smaller number of printing materials in a read-out image acquired by reading an image formed using a printing material including a plurality of colors, the correction information corresponding to a printing material for which correction information has not been generated among the printing materials used for the region.

* * * * *